UNITED STATES PATENT OFFICE.

OTTO FISCHER, OF MUNICH, GERMANY.

PREPARATION OF ROSANILINE-BLUE COLORING-MATTER.

SPECIFICATION forming part of Letters Patent No. 252,203, dated January 10, 1882.

Application filed January 26, 1881. (Specimens.)

*To all whom it may concern:*

Be it known that I, Dr. OTTO FISCHER, of Munich, Germany, have invented a new and useful Improvement in Preparation of Diphenyl-Rosaniline, of which the following is a specification.

My invention relates to a new coloring-matter consisting of rosaniline-blue prepared from paranitrobenzaldehyde and aromatic amines, as fully described hereinafter.

The main feature of the invention consists in preparing aniline-blue by the formation of nitroleuco bases from paranitrobenzaldehyde and diphenylamine in the presence of dehydrating agents, which nitroleuco bases can be converted into aniline-blue, either direct or after transforming them into amidoleuco bases. A process of this character is described in the Letters Patent granted to me October 11, 1881, No. 248,153.

A mixture of fifteen parts of paranitrobenzaldehyde, thirty-four parts of diphenylamine, and of thirty-five parts of zinc chloride, is heated at 212° Fahrenheit (100° centigrade) until the smell of paranitrobenzaldehyde has disappeared.

The formation of the nitrodiphenyldiamidotriphenylmethan takes place according to the formula: $NO_2C_6H_4COH + NH(C_6H_5)_2 = NO_2.C_6H_4CH \begin{Bmatrix} C_6H_4NHC_6H_5 \\ C_6H_4NHC_6H_5 \end{Bmatrix} + H_2O.$ From the smelt prepared after the above-described method I obtain the nitroleuco base by washing the smelt with water and then treating with boiling diluted acids. The yellowish-green mass that remains is the nitroleuco base. By heating in an oil-bath at 320° to 356° Fahrenheit (160° to 180° centigrade) this nitroleuco base with chloride of iron or other metallic salts having oxidating properties until the mixture forms a homogeneous copper-like mass, I obtain direct an aniline-blue which can be purified in the usual manner.

To prepare the amidoleuco base of the diphenyltriamidotriphenylmethan, I treat the nitroleuco base with reducing agents—such as iron, zinc, tin, tin dichloride, &c.—in presence of muriatic or of acetic acid, and to the obtained solution I add soda lye in excess.

The purified amidoleuco base I oxidize by well-known oxidizing agents, such as manganese dioxide, lead dioxide, chloranil, &c.; and I purify the resulting aniline-blue in the usual manner.

The rosaniline-blue compound thus produced has the properties of the ordinary rosaniline-blue prepared by the known methods.

I do not limit myself to the exact proportions, as they may be varied without departing from the principle of my invention.

I claim as my invention—

As a new article of manufacture, the herein-described blue coloring-matter, consisting of rosaniline prepared from paranitrobenzaldehyde and diphenylamine, as hereinbefore set forth.

In testimony whereof I have signed my name to this specification in the presence of two subscribing witnesses.

OTTO FISCHER.

Witnesses:
PHILIPP GREIFF,
FRANZ HASSLACHER.